(12) United States Patent
Tsai et al.

(10) Patent No.: US 7,852,403 B2
(45) Date of Patent: Dec. 14, 2010

(54) ELECTRONIC DEVICE WITH IMAGE CAPTURING DEVICE

(75) Inventors: Chu-Chia Tsai, Taipei (TW); Yi-Wei Tao, Taipei (TW); Chia-Hsien Li, Taipei (TW); An-Chung Hsieh, Taipei (TW); Yi-Lang Chi, Taipei (TW); Tien-Fu Lee, Taipei (TW); Meng-Hsiang Chen, Taipei (TW); I-Ting Chiang, Taipei (TW)

(73) Assignee: Wistron Corp., Taipei Hsien (TW)

( * ) Notice: Subject to any disclaimer, the term of this patent is extended or adjusted under 35 U.S.C. 154(b) by 434 days.

(21) Appl. No.: 11/874,143

(22) Filed: Oct. 17, 2007

(65) Prior Publication Data

US 2008/0225161 A1 Sep. 18, 2008

(30) Foreign Application Priority Data

Mar. 15, 2007 (TW) ................................ 96108884 A (51) Int. Cl.
*H04N 5/225* (2006.01)
*H04N 5/253* (2006.01)
*G03B 15/00* (2006.01)

(52) U.S. Cl. ..................... 348/375; 348/376; 348/373; 348/96; 396/5

(58) Field of Classification Search .................. 348/96, 348/188, 373–376; 396/3, 5, 348
See application file for complete search history.

(56) References Cited

U.S. PATENT DOCUMENTS

| 3,385,188 | A | * | 5/1968 | Ellman | 396/199 |
| 3,622,239 | A | * | 11/1971 | Miller | 355/39 |
| 3,650,186 | A | * | 3/1972 | Stelck | 396/336 |
| 3,687,030 | A | * | 8/1972 | Dine et al. | 396/544 |
| 3,836,927 | A | * | 9/1974 | Dine et al. | 396/544 |
| 3,898,683 | A | * | 8/1975 | Breads | 396/5 |
| 4,268,155 | A | * | 5/1981 | Lehnert et al. | 396/419 |
| 4,283,135 | A | * | 8/1981 | Lupis | 396/544 |
| 4,616,912 | A | * | 10/1986 | Johnsen | 396/5 |
| 4,755,838 | A | * | 7/1988 | Lemmey | 396/155 |
| 4,951,072 | A | * | 8/1990 | Harvey et al. | 396/5 |
| 5,218,403 | A | * | 6/1993 | Smith | 355/39 |
| 5,444,486 | A | * | 8/1995 | Mizuno et al. | 348/376 |
| 5,757,430 | A | * | 5/1998 | Maeda et al. | 348/373 |
| 5,950,017 | A | * | 9/1999 | Reff | 396/14 |
| 6,052,534 | A | * | 4/2000 | Goto | 396/71 |
| 6,229,961 | B1 | * | 5/2001 | Torikoshi et al. | 396/71 |
| 6,339,447 | B1 | * | 1/2002 | Kurahashi et al. | 348/96 |
| 6,798,985 | B2 | * | 9/2004 | Reff | 396/14 |

(Continued)

*Primary Examiner*—David L Ometz
*Assistant Examiner*—Richard Bemben (57) ABSTRACT

An electronic device comprises a body, a first image capturing element, a cover and a arm. The body comprises a first surface and a second surface, with the first surface opposite to the second surface. The first image capturing element is disposed on the first surface. The cover is connected to the body, movable between a first cover position and a second cover position, wherein the cover covers the first image capturing element when the cover is in the first cover position, and the first image capturing element is actuated when the cover is in the second cover position. The arm is connected to the cover, pivoting between a first position and a second position, wherein when the arm is in the second position, a recording medium is received on a first end of the arm, and the first image capturing element captures an image data therefrom.

14 Claims, 14 Drawing Sheets

U.S. PATENT DOCUMENTS

| | | | |
|---|---|---|---|
| 7,050,106 B2* | 5/2006 | Nagano | 348/373 |
| 7,057,641 B2* | 6/2006 | Bodnar et al. | 348/188 |
| 7,194,200 B1* | 3/2007 | Behlow | 396/5 |
| 2003/0089832 A1* | 5/2003 | Gold | 248/454 |
| 2003/0095200 A1* | 5/2003 | Nagano | 348/373 |
| 2003/0133703 A1* | 7/2003 | Lin et al. | 396/3 |
| 2004/0119831 A1* | 6/2004 | Miyawaki | 348/207.99 |
| 2004/0201776 A1* | 10/2004 | Teong et al. | 348/375 |
| 2006/0034601 A1* | 2/2006 | Andersson et al. | 396/157 |
| 2008/0122970 A1* | 5/2008 | Lin | 348/373 |

* cited by examiner

ELECTRONIC DEVICE WITH IMAGE CAPTURING DEVICE

BACKGROUND OF THE INVENTION

1. Field of the Invention

The invention relates to an electronic device, and more particularly to an electronic device with an arm as a stand for image capturing.

2. Description of the Related Art

Figure 1A:
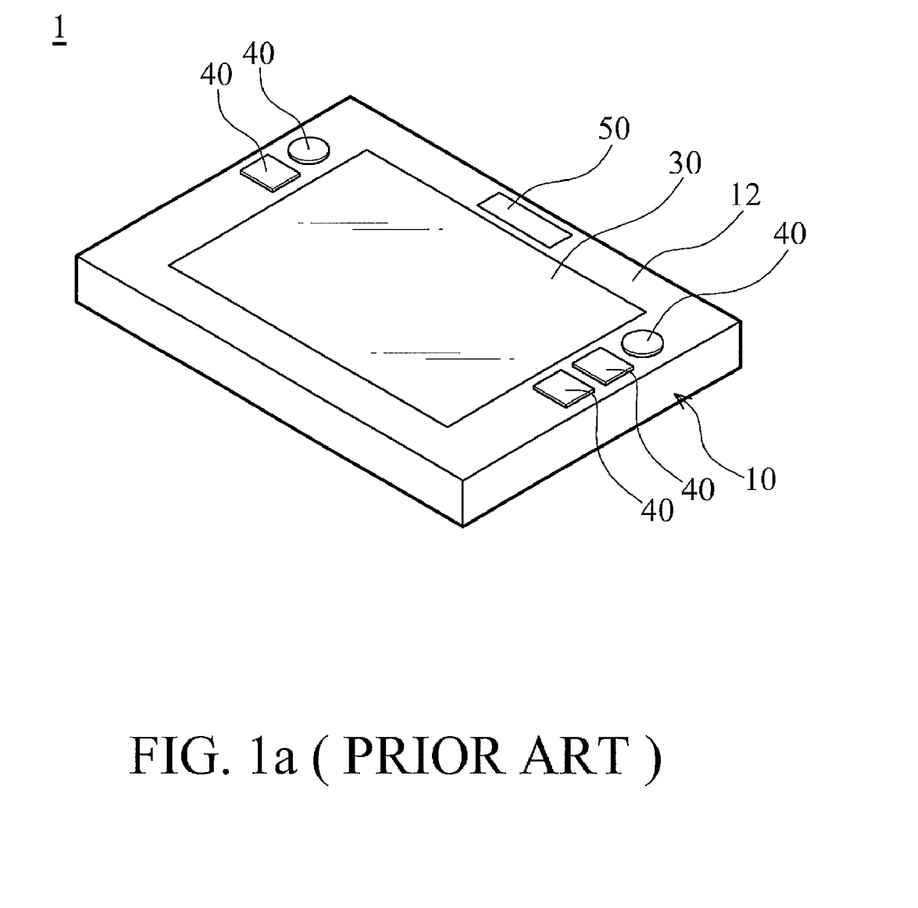
FIGS. 1a, 1b and 1c show conventional ultra mobile personal computer (UMPC)
Figure 1B:
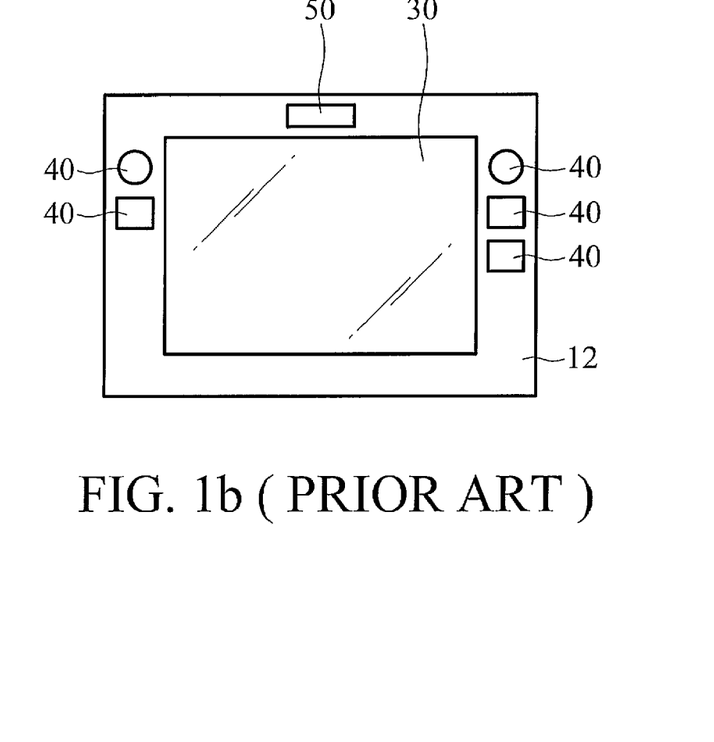
Figure 1C:
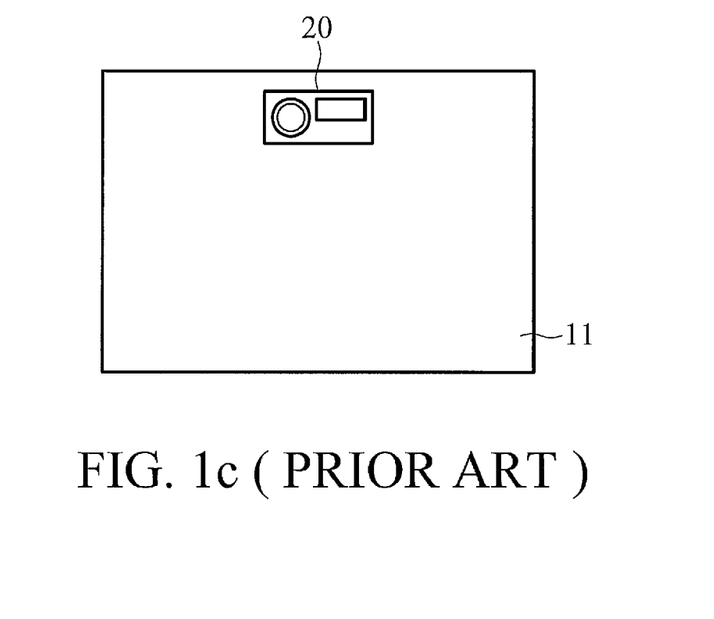

FIGS. 1a, 1b and 1c show conventional ultra mobile personal computer (UMPC) 1, comprising a body 10, a first image capturing element 20, a display 30, a control interface 40 and a second image capturing element 50. The body 10 comprises a first surface 11 and a second surface 12. The first surface 11 is opposite to the second surface 12. The first image capturing element 20 is disposed on the first surface 11. The display 30, the control interface 40 and the second image capturing element 50 are disposed on the second surface 12. Pixel number of the second image capturing element 50 is lower than that of the first image capturing element 20.

Figure 1D:
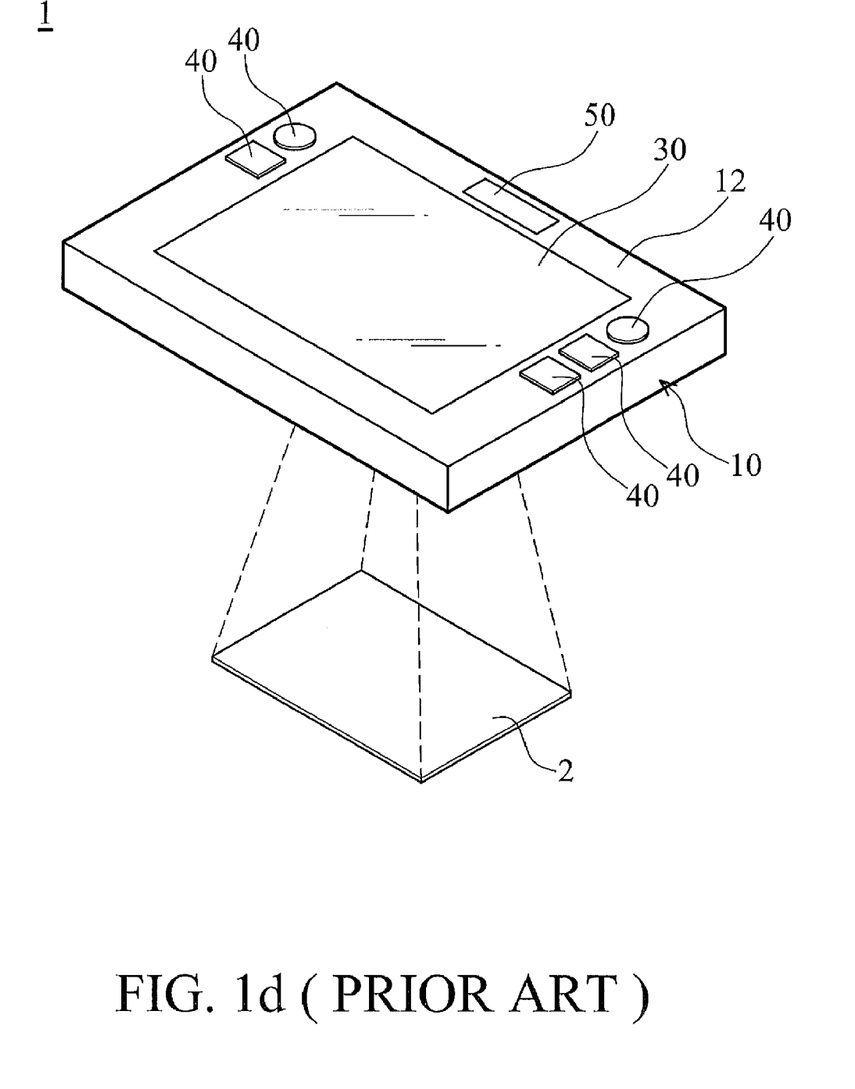
FIG. 1d shows conventional UMPC utilized in copying recording media.

With reference to FIG. 1d, when a recording medium 2 (for example, business card) is copied with conventional UMPC 1, the recording medium 2 is placed on a table, and the user manually adjusts distance and orientation of the UMPC 1 corresponding to the recording medium 2. However, user hands are unstable, and orientation of the UMPC 1 corresponding to the recording medium 2 cannot be precisely controlled. The image copying process is inconvenient and results in poor quality.

BRIEF SUMMARY OF THE INVENTION

A detailed description is given in the following embodiments with reference to the accompanying drawings.

The embodiment relates to an electronic device comprising a body, a first image capturing element, a cover and an arm. The body comprises a first surface and a second surface, with the first surface opposite to the second surface. The first image capturing element is disposed on the first surface. The cover is connected to the body, movable between a first cover position and a second cover position, wherein the cover covers the first image capturing element when the cover is in the first cover position, and the first image capturing element is actuated when the cover is in the second cover position. The arm is connected to the cover, pivoting between a first position and a second position, wherein when the arm is in the second position, a recording medium is received on a first end of the arm, and the first image capturing element captures an image data therefrom.

Utilizing the electronic device of the embodiment, position of recording media corresponding to the first image capturing element can be fixed, and image data of recording media can be captured stably and conveniently.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
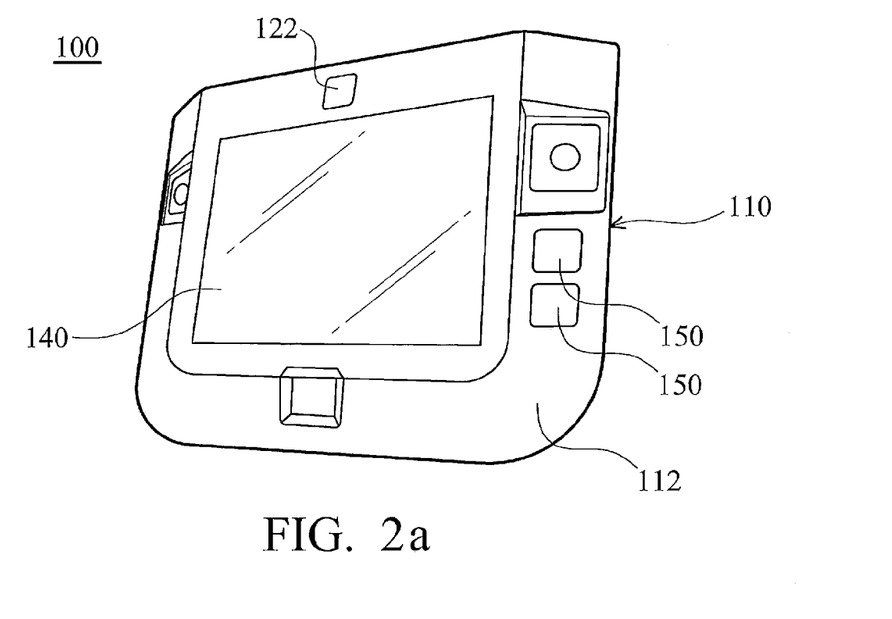
FIG. 2a shows an electronic device of a first embodiment of the invention.
Figure 2B:
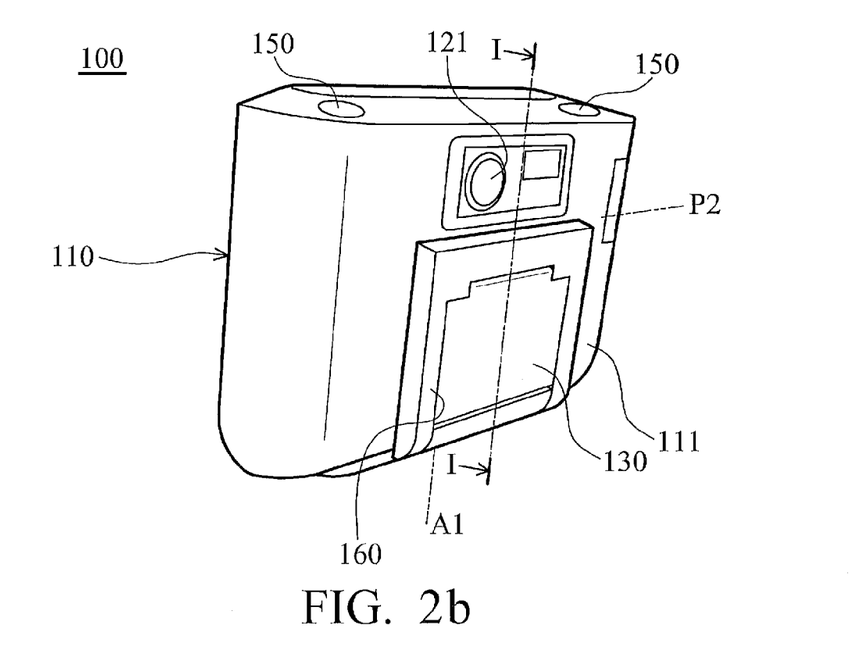
FIG. 2b shows an arm in a first position.

FIGS. 2a and 2b show an electronic device (ultra mobile personal computer) 100 of a first embodiment, comprising a body 110, a first image capturing element 121, a second image capturing element 122, an arm 130, a display 140, a control interface 150 and a cover 160. The body comprises a first surface 111 and a second surface 112. The first surface 111 is opposite to the second surface 112. The first image capturing element 121 is disposed on the first surface 111. The second image capturing element 122 and the display 140 are disposed on the second surface 112. The control interface 150 is disposed on the body 110. The cover 160 is disposed on the first surface 111 connected to the body 110. The arm 130 is connected to the cover 160.

Figure 2C:
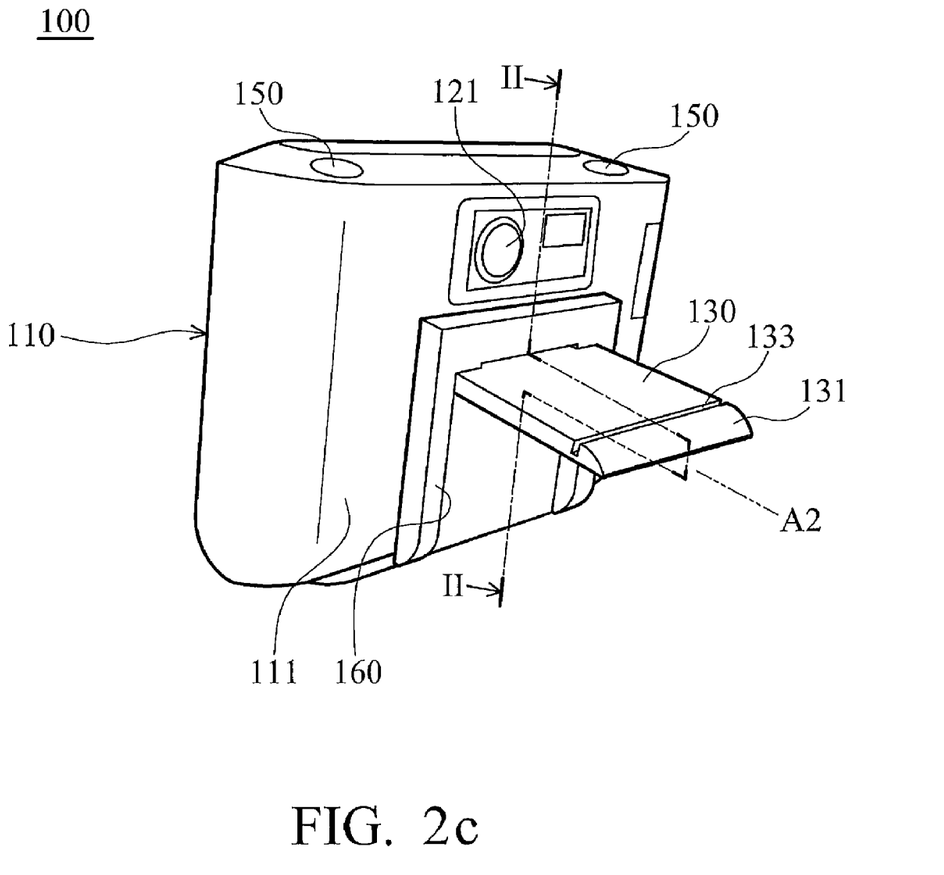
FIG. 2c shows the arm in a second position.
Figure 3A:
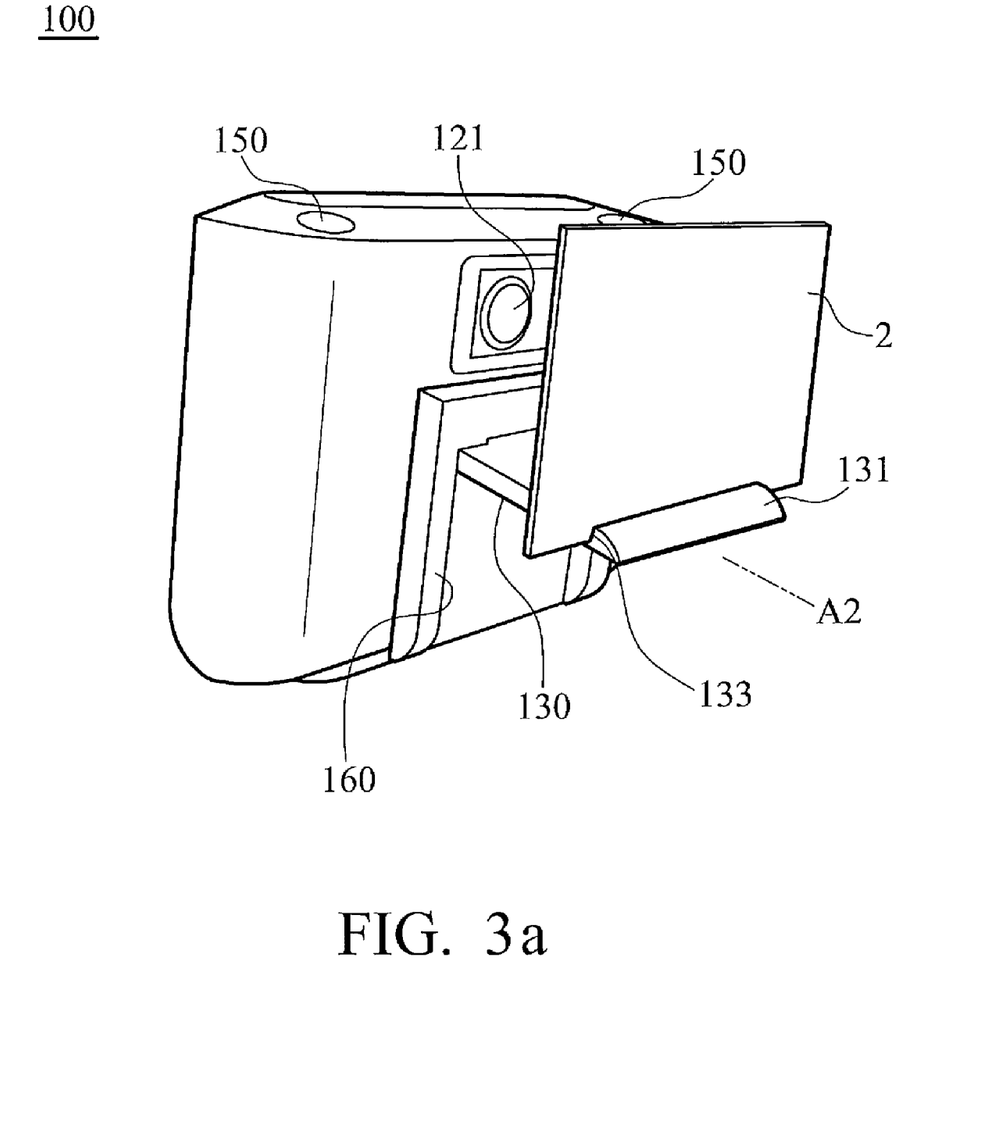
FIG. 3a shows a recording medium inserted in a slot.
Figure 3B:
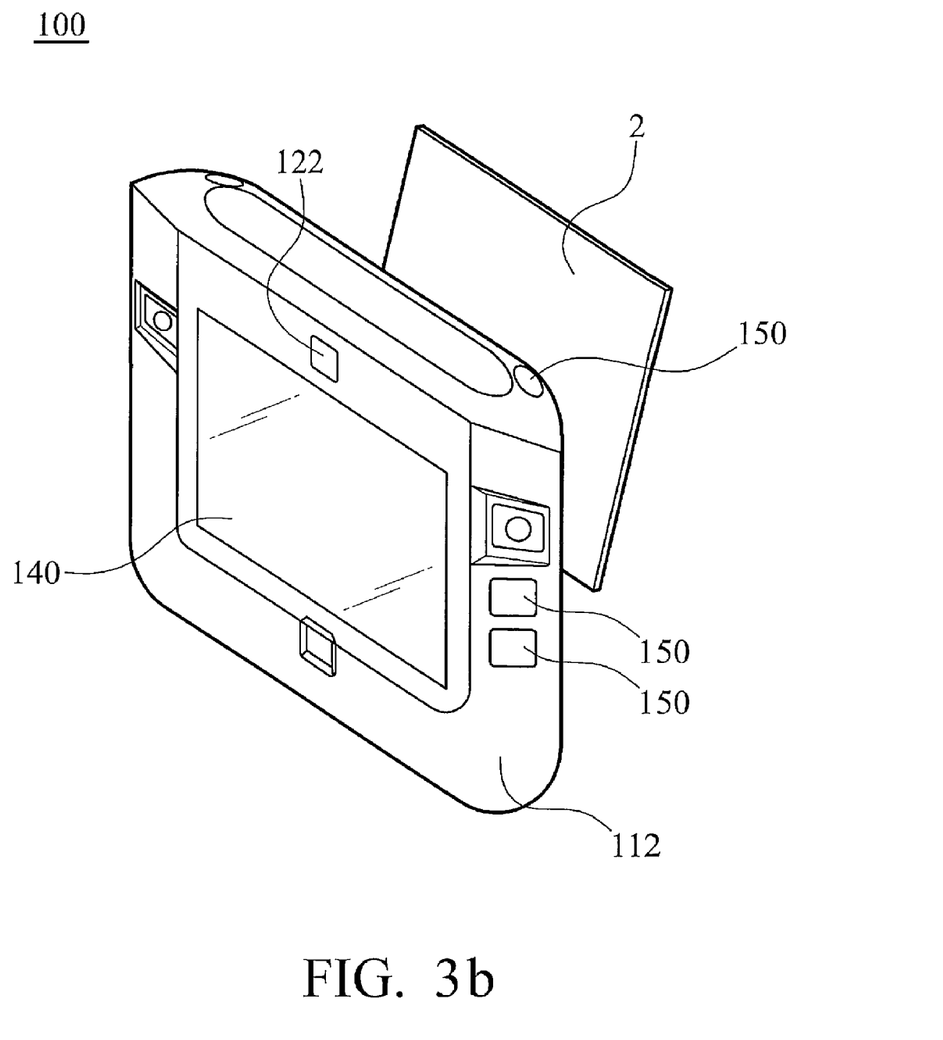
FIG. 3b shows the electronic device capturing image data from the recording medium.

With reference to FIGS. 2b and 2c, the arm 130 pivots between a first position A1 and a second position A2. The arm 130 comprises a slot 133 formed on a first end 131 thereof. With reference to FIG. 3a, when the arm 130 is in the second position A2, a recording medium (for example, name card) 2 is inserted into the slot 133 to be received on the first end 131 of the arm 130, and the first image capturing element 121 captures an image data therefrom. With reference to FIG. 3b, the electronic device 100 shows the image data through the display 140, and the user confirms whether or not to store the image data into a memory unit of the electronic device 100 via the control interface 150.

The electronic device 100 of the first embodiment comprises the arm 130 for fixing the position of the recording medium 2 corresponding to the first image capturing element 121. Therefore, utilizing the electronic device 100, the image data of the recording medium 2 can be captured stably and conveniently.

Figure 4:
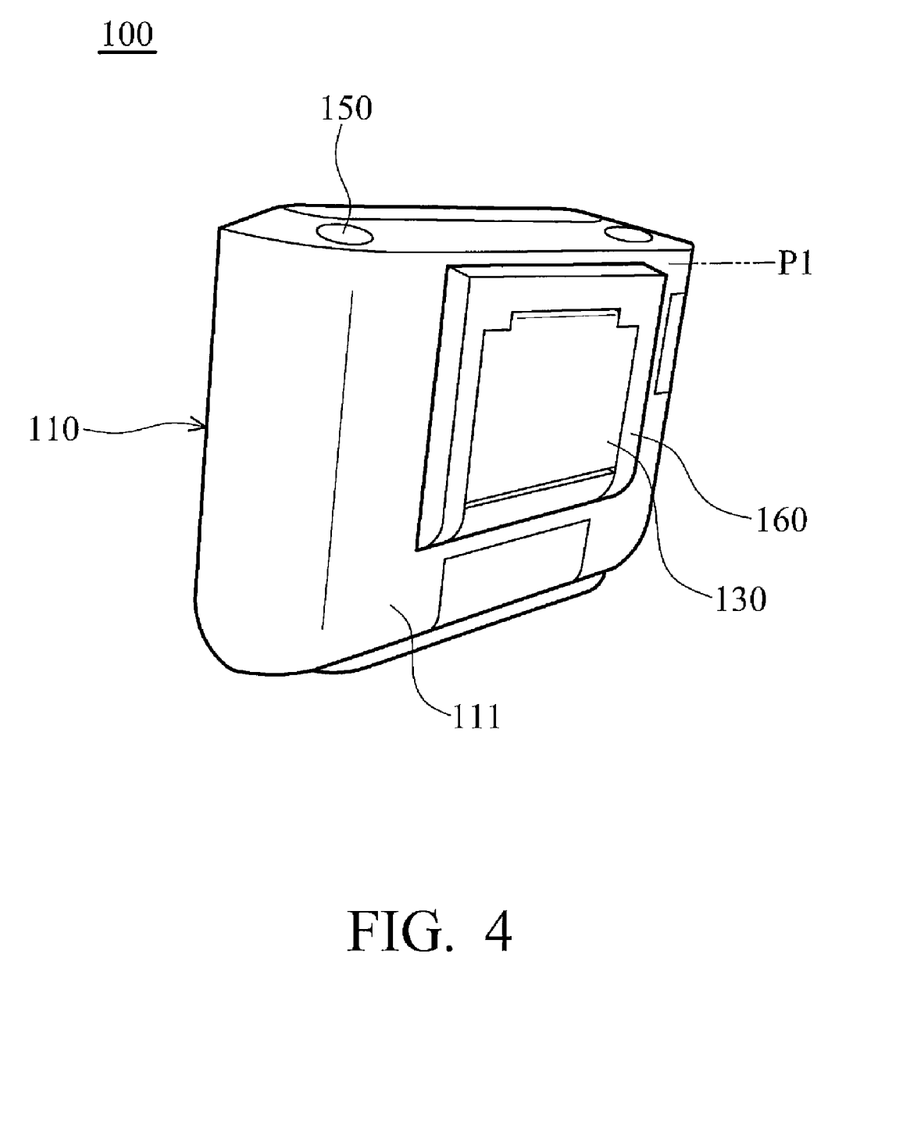
FIG. 4 shows a cover in a first cover position.

With reference to FIGS. 4 and 2b, the cover 160 moves between a first cover position P1 and a second cover position P2. The cover 160 covers and protects the first image capturing element 121 when the cover 160 is in the first cover position P1. The first image capturing element 121 is actuated when the cover 160 is in the second cover position P2.

Figure 5:
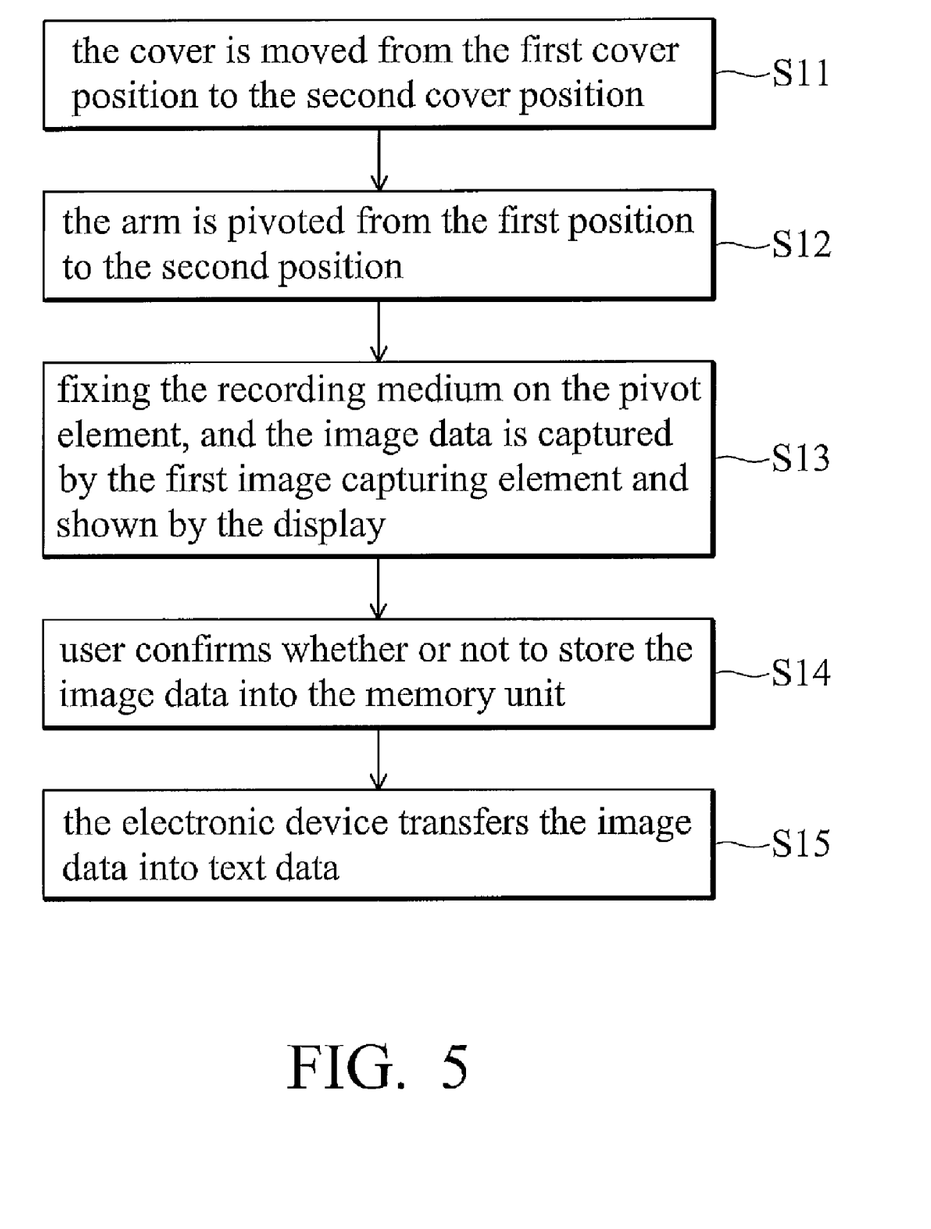
FIG. 5 shows a flowchart of an image capturing process of the first embodiment.

FIG. 5 shows a flowchart of an image capturing process of the first embodiment. First, the cover is moved from the first cover position to the second cover position to actuate the first image capturing element (S11). Then, the arm is pivoted from the first position to the second position, and the electronic device enters an image capturing state (S12). Next, the recording medium is received the arm, and the image data is captured by the first image capturing element and shown by the display (S13). Then, the user confirms whether or not to store the image data into the memory unit (S14). Finally, the electronic device transfers the image data into text data (S15).

In the image capturing state, the image capturing element enters a close-up state, wherein the view angle thereof is 75° to 80°, and the focal length thereof is modified to a predetermined focal length automatically.

Figure 6A:
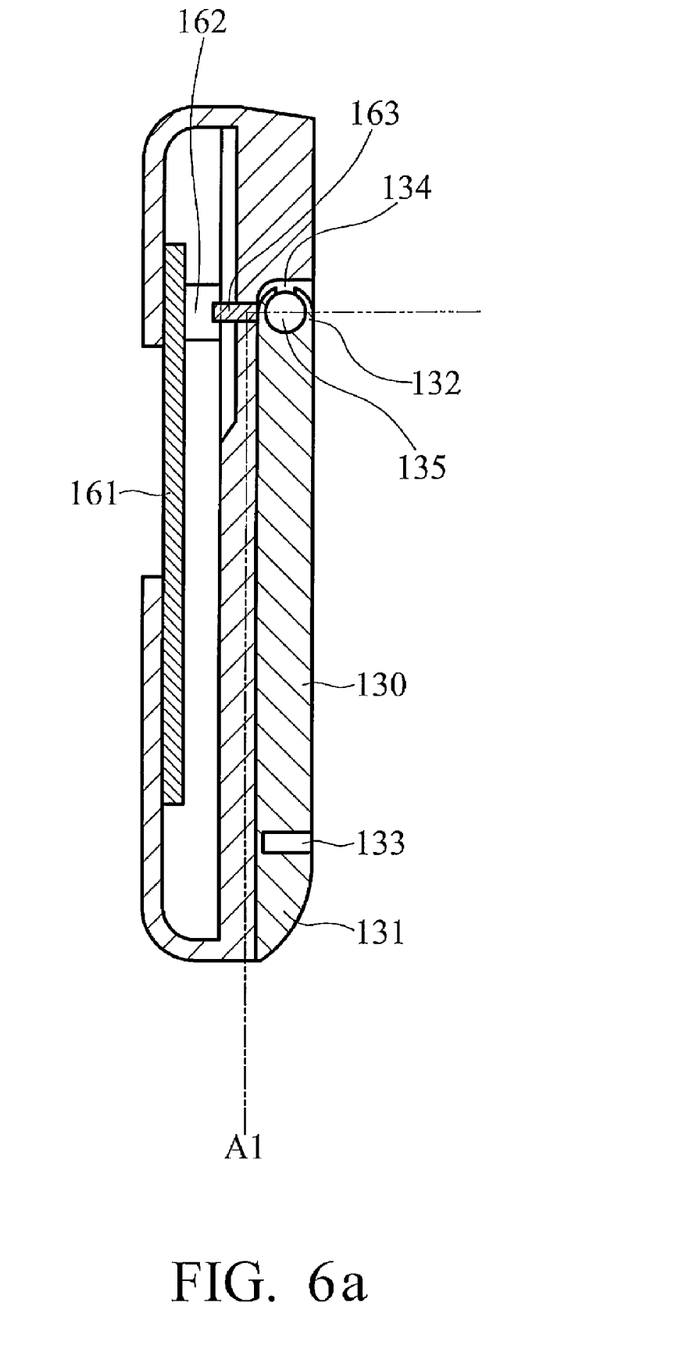
FIG. 6a is a sectional view along direction I-I of FIG. 2b.
Figure 6B:
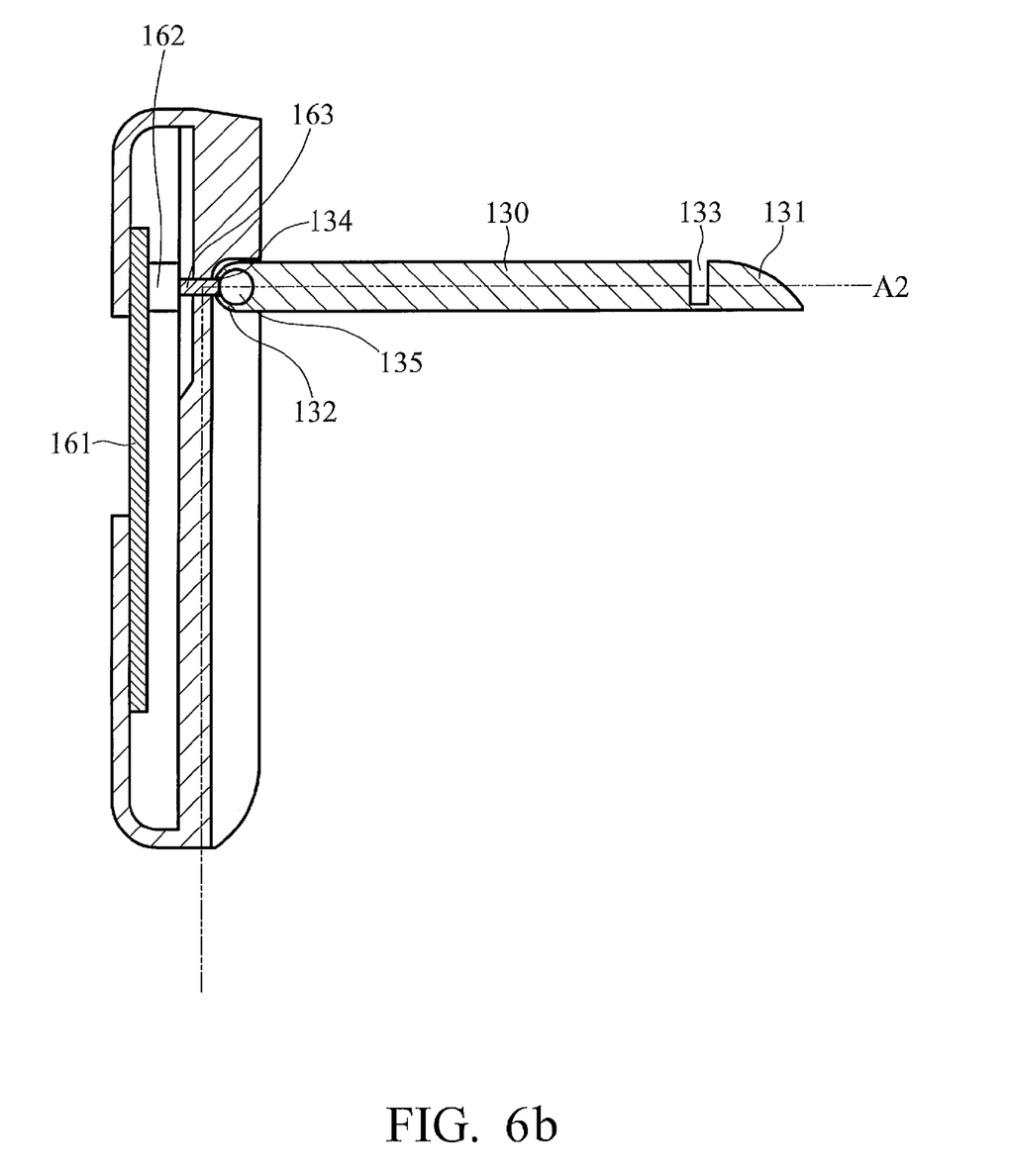
FIG. 6b is a sectional view along direction II-II of FIG. 2c.

FIG. 6a is a sectional view along direction I-I of FIG. 2b, and FIG. 6b is a sectional view along direction II-II of FIG. 2c. The electronic device further comprises an position detector 162 disposed on the circuit board 161. The circuit board 161 and the position detector 162 are disposed in the cover. The arm 130 further comprises a shaft 135 and a groove 134 formed on a second end 132 thereof. The arm 130 pivots on the shaft 135. The position detector 162 comprises a protrusion 163 extending perpendicular to the first surface. With reference to FIG. 6a, when the arm 130 is in the first position A1, the protrusion 163 is pressed by the arm 130, and the position detector 162 does not emit signal. With reference to FIG. 6b, when the arm 130 is in the second position A2, the protrusion 163 extends into the groove 134, the position detector 162 emits an electronic signal, and the electronic device enters the image capturing state according to the electronic signal.

Figure 7:
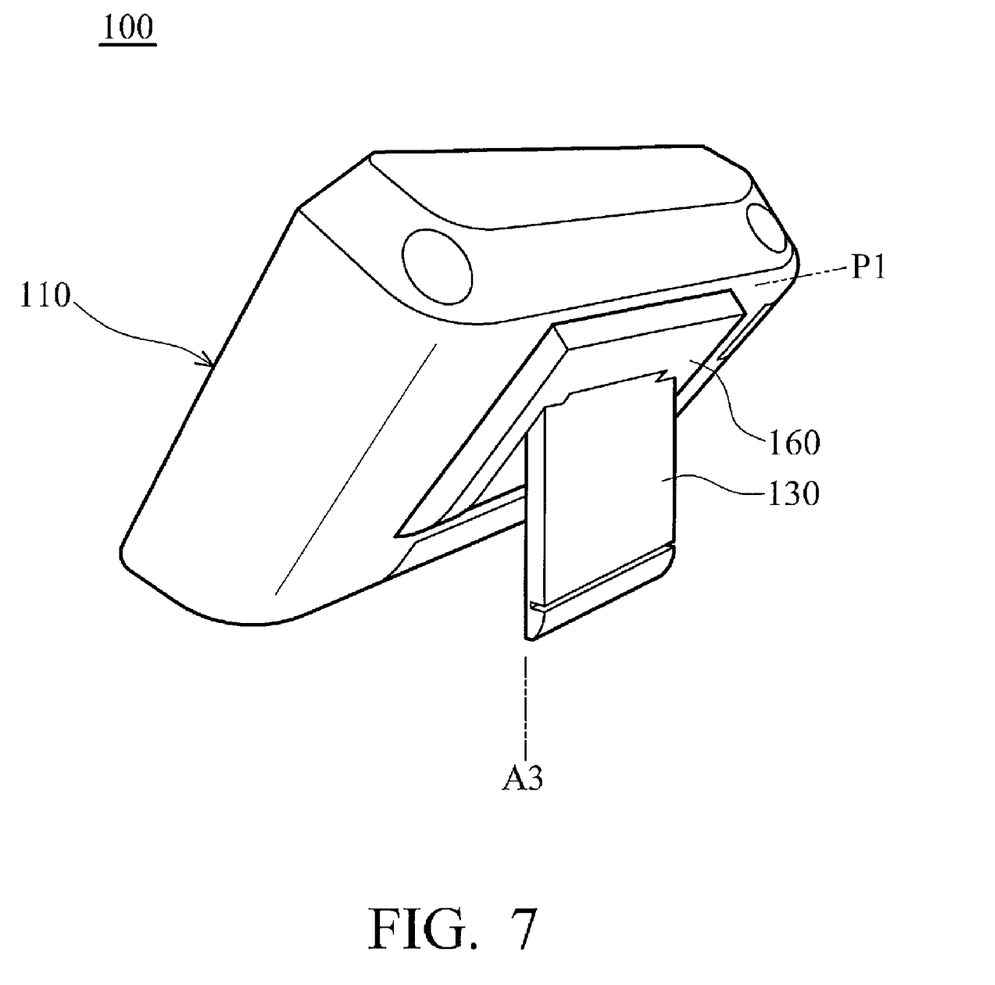
FIG. 7 shows the arm in a third position.

In the embodiment, an orientation angle between the first and second positions is between 0° to 90°. With reference to FIG. 7, the arm 130 can be positioned in a third position A3 between the first position A1 and the second position A2 by wedging. When the arm 130 is in the third position A3, the arm 130 supports the electronic device 100 as a stand to keep the electronic device 100 in tilt, and user can watch a movie through the display 140. In the first embodiment, the cover 160 is in the first cover position P1 when the arm 130 is in the third position A3. However, in a modified embodiment, when the arm 130 is in the third position A3, the cover 160 can be in the second cover position P2.

Figure 8A:
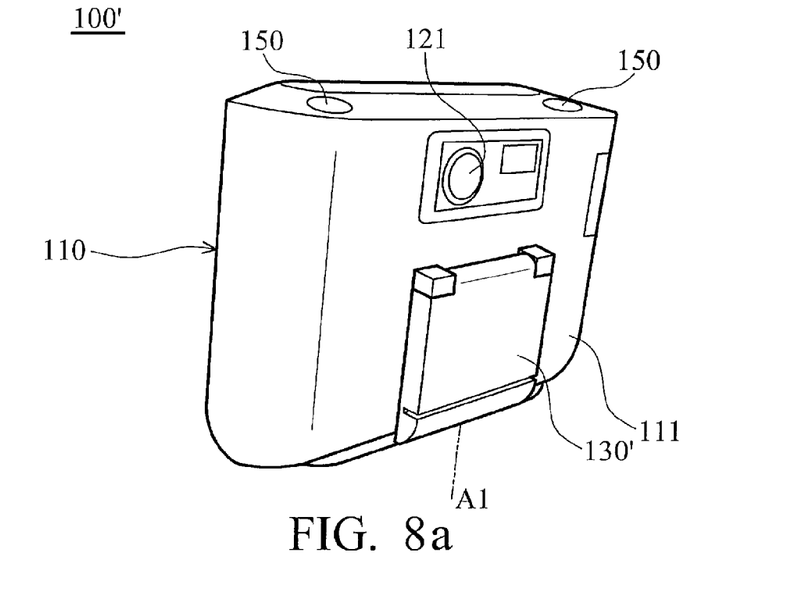
FIG. 8a shows an arm in a first position in a second embodiment.
Figure 8B:
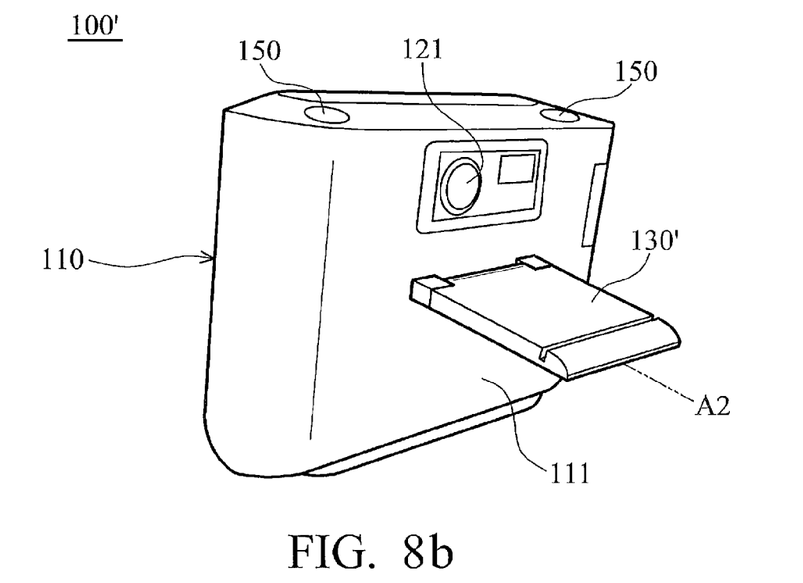
FIG. 8b shows the arm in a second position in a second embodiment.

FIGS. 8a and 8b shows an electronic device 100' of a second embodiment of the invention, wherein the arm 130 is disposed on the first surface 111 connected to the body 110, and pivots between a first position A1 and a second position A2. When the arm 130 is in the first position A1, the arm 130 contacts the first surface 111. When the position element 130 is in the second position A2, the electronic device 100' enters the image capturing state to capture the image data from recording media.

Figure 9:
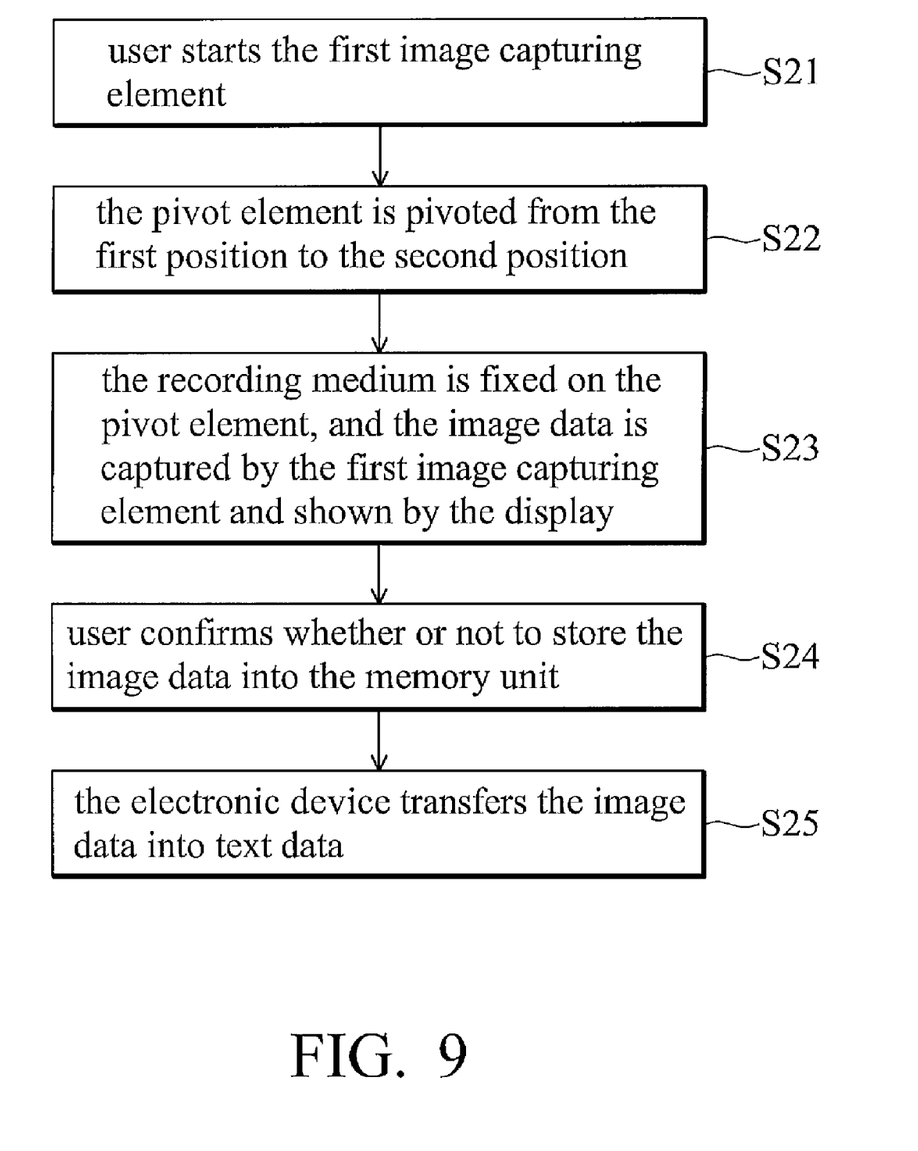
FIG. 9 shows a flowchart of an image capturing process of the second embodiment.

FIG. 9 shows a flowchart of an image capturing process of the second embodiment. First, user starts the first image capturing element (S21). Then, the arm is pivoted from the first position to the second position, and the electronic device enters the image capturing state (S22). Next, the recording medium is received on the arm, and the image data is captured by the first image capturing element and shown by the display (S23). Then, the user confirms whether or not to store the image data into the memory unit (S24). Finally, the electronic device transfers the image data into text data (S25).

Like the first embodiment, the electronic device 100' of the second embodiment also comprises an position detector and a circuit board disposed in the body 110 of the electronic device 100' to detect the position of the arm 130. Additionally, in the second embodiment, the arm 130 can also be positioned in a third position A3 between the first position A1 and the second position A2.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device capable of capturing images, comprising:
   a body, comprising a first surface and a second surface, with the first surface opposite to the second surface;
   a first image capturing element, disposed on the first surface; an arm, connected to the body, pivoting between a first position and a second position, wherein when the arm is in the second position to receive an object on a first end of the arm, the first image capturing element captures an image data of the object; and
   a position detector, disposed in the body, wherein when the arm is in the second position, the arm actives the position detector, the position detector emits an electronic signal, and the electronic device enters the image capturing state, wherein the position detector comprises a protrusion extending perpendicular to the first surface, the arm has a groove formed on a second end thereof, and when the arm is in the second position, the protrusion inserts the groove to actuate the position detector emitting the electronic signal,
   wherein when the arm is in the second position, the electronic device enters an image capturing state, the first image capturing element starts an image capturing function.

2. The electronic device as claimed in claim 1, further comprising a display, wherein the display is disposed on the second surface.

3. The electronic device as claimed in claim 2, the display shows the image data captured by the first image.

4. The electronic device as claimed in claim 3, wherein the electronic device transforms the image data into a text data after the first image capturing element captures the image data.

5. The electronic device as claimed in claim 1, wherein a slot is formed on the first end of the arm to receive the object is inserted into the slot.

6. The electronic device as claimed in claim 1, wherein the arm can be positioned in a third position between the first and second positions.

7. An electronic device capable of capturing images, comprising:
   a body, comprising a first surface and a second surface, with the first surface opposite to the second surface;
   a first image capturing element, disposed on the first surface; a cover, connected to the body, movable between a first cover position and a second cover position, wherein the cover covers the first image capturing element when the cover is in the first cover position, and the first image capturing element is actuated when the cover is in the second cover position;
   an arm, connected to the cover, pivoting between a first position and a second position, wherein when the arm is in the second position to receiving an object on a first end of the arm, the first image capturing element captures an image data of the object; and
   an position detector, disposed in the cover, wherein when the arm is in the second position, the arm actives the position detector, the position detector emits an electronic signal, and the electronic device enters the image capturing state according to the electronic signal, wherein the position detector comprises a protrusion extending perpendicular to the first surface, the arm has a groove formed on a second end thereof, and when the arm is in the second position, the protrusion inserts the groove to actuate the position detector emitting the electronic signal, wherein when the arm is in the second position, the electronic device enters an image capturing state, the first image capturing element starts an image capturing function.

8. The electronic device as claimed in claim 7, wherein the arm comprises a slot, formed on the first end of the arm to receive the object that is inserted into the slot.

9. The electronic device as claimed in claim 7, further comprising a display, disposed on the second surface.

10. The electronic device as claimed in claim 9, wherein when the arm is in the second position, the electronic device enters an image capturing state, the first image capturing element starts an image capturing function, and the display shows the image data captured by the first image.

11. The electronic device as claimed in claim 10, wherein the electronic device transforms the image data into a text data after the first image capturing element captures the image data.

12. The electronic device as claimed in claim 7, wherein the arm can be positioned in a third position between the first and second positions.

13. The electronic device, as claimed in claim 7, wherein an orientation angle between the first and second positions is between 0° to 90°.

14. The electronic device as claimed in claim 1, wherein when the arm is in the first position, the arm contacts the first surface.

* * * * *